United States Patent
Manohar et al.

(10) Patent No.: US 10,592,122 B2
(45) Date of Patent: Mar. 17, 2020

(54) INHERENT ADAPTIVE TRIMMING

(71) Applicant: SANDISK TECHNOLOGIES LLC, Plano, TX (US)

(72) Inventors: Abhijeet Manohar, Bangalore (IN); Daniel Tuers, Kapaa, HI (US); Sathyanarayanan Subramanian, Bangalore (IN); Judah Gamliel Hahn, Ofra (IL)

(73) Assignee: SANDISK TECHNOLOGIES LLC, Plano, TX (US)

( * ) Notice: Subject to any disclaimer, the term of this patent is extended or adjusted under 35 U.S.C. 154(b) by 301 days.

(21) Appl. No.: 14/675,261

(22) Filed: Mar. 31, 2015

(65) Prior Publication Data

US 2016/0291883 A1     Oct. 6, 2016

(51) Int. Cl.
*G06F 3/06*     (2006.01)

(52) U.S. Cl.
CPC .......... *G06F 3/0613* (2013.01); *G06F 3/0656* (2013.01); *G06F 3/0659* (2013.01); *G06F 3/0679* (2013.01)

(58) Field of Classification Search
CPC .... G06F 3/0613; G06F 3/0679; G06F 3/0659; G06F 3/0656
See application file for complete search history.

(56) References Cited

U.S. PATENT DOCUMENTS

| | | | |
|---|---|---|---|
| 7,427,027 B2 | 9/2008 | Elhamias et al. | |
| 7,926,720 B2 | 4/2011 | Elhamias et al. | |
| 8,292,177 B2 | 10/2012 | Elhamias et al. | |
| 8,375,114 B2* | 2/2013 | Grover | G06F 17/30067 709/223 |
| 2006/0112250 A1* | 5/2006 | Walker | G06F 13/1689 711/167 |
| 2006/0206651 A1* | 9/2006 | Wu | G06F 13/4027 710/306 |
| 2008/0104283 A1* | 5/2008 | Shin | G06F 3/0611 710/6 |
| 2008/0250220 A1* | 10/2008 | Ito | G06F 12/0246 711/173 |
| 2011/0283128 A1* | 11/2011 | Farhan | G06F 1/3215 713/324 |
| 2012/0066449 A1* | 3/2012 | Colgrove | G06F 3/061 711/114 |
| 2014/0337598 A1* | 11/2014 | Rao | G06F 3/0613 711/167 |
| 2015/0347291 A1* | 12/2015 | Choi | G06F 12/0246 711/103 |
| 2015/0347330 A1* | 12/2015 | Vaishampayan | G06F 1/206 710/60 |
| 2016/0179428 A1 | 6/2016 | Parker et al. | |
| 2016/0180951 A1 | 6/2016 | Darragh et al. | |

* cited by examiner

*Primary Examiner* — David Yi
*Assistant Examiner* — Alan Otto
(74) *Attorney, Agent, or Firm* — Dickinson Wright PLLC; Steven Craig Hurles (57) ABSTRACT

A memory system may use adaptive trimming to control throughput and traffic from the host to/from the memory. The trimming parameters of memory may be adaptively changed based on the data rate from the host. The programming speed may be slowed in order to reduce wear and improve endurance. In particular, the data rate for the transfer of data from a data buffer to the memory (e.g. NAND flash) may be matched to the host data rate. This programming speed reduction may be triggered upon prediction of idle times in the host bus.

20 Claims, 7 Drawing Sheets

INHERENT ADAPTIVE TRIMMING

TECHNICAL FIELD

This application relates generally to memory devices. More specifically, this application relates to the improving memory endurance in non-volatile semiconductor flash memory.

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. NAND is one example of a non-volatile flash memory. Flash memory may have a limited endurance, which determines a number of times a particular memory can be erased and re-programmed. Reducing the wear on the memory may help to improve the endurance. Trimming may be used to reduce wear. In one example, the programming voltage may be reduced while maintaining the programming speed in order to meet a minimum write throughput. The host may require a specific and sustained write performance which allows for voltage adjustments but not speed adjustments.

DESCRIPTION OF THE EMBODIMENTS

Adaptive trimming may be used to control throughput and traffic from the host to/from the memory. The trimming parameters of memory may be adaptively changed based on the data rate from the host even in a sustained environment. For example, the programming speed may be optimized, which includes reducing the programming speed to reduce wear and improve endurance. The optimization may include limiting the data rate from the data buffer to the memory (e.g. NAND flash) to the host data rate. The memory parameters may be tuned based on host idle time. The memory system and methods described below include adaptively changing trimming parameters of memory based on the data rate from the host. In particular, the throughput from a buffer to the memory (e.g. flash) can be reduced. For example, the throughput from the buffer to the flash may be reduced to match the throughput from the host (to the buffer).

The throughput may be adaptively changed depending on the data to be written or other conditions with the memory device. The detection (of optimal conditions for slow programming) may be achieved by looking at the flash bus to determine when the controller should change the trim set parameters due to the write throughput and traffic pattern. The flash busy times may extend for the higher endurance trim sets. In NVMe devices, measuring HTAT in an idle device using different queue priorities may be used to detect whether slow write is enabled on low-priority queues. There may be several embodiments which may be used to identify the optimal conditions for adaptively trimming the throughput. The other embodiments described below are merely exemplary.

In one embodiment, the memory device may look for sporadic writes interleaved with power saving modes, and try to capture several benefits. For example, the idle time before re-entering power saving states may be used for a slow program. Also, a very small piece of data is usually written along with a flush command which can be collected during idle time. There is a possibility to combine persistent cold data in need of scrubbing or some other data in order to free a block for the next compaction cycle. Parts of the flash that have persistent data may need to be scrubbed for reliability purposes. Alternatively, data may need to be moved to free up space. During any idle time (e.g. in anticipation of sporadic writes), such data may be read from the flash.

In another embodiment, when there are multiple input/output queues enabled on the host (e.g. using a protocol such as NVMe or through multiple core processors). The input/output queue(s) may be analyzed to identify potential candidates for slower writes. This detection can be done on a queue-by-queue basis, thus separating out and aggregating sporadic writes while maintaining full performance on sustained writes in another queue. Slow writes may be destined to specific dies while the other dies maintain sustained operation and the host continues to send other commands. In another example, any flush commands tend to include idle time, so the controller can take advantage of the idle times to write slower from the buffer to the flash. Queue depth from a host side queue may also be used for identifying write commands that are candidates for slower flash writing. The queue may include priorities for upcoming write commands and priority queues can provide information about latencies which may be unimportant in a low priority queue which may be a candidate for a slower program.

In a multiple queue environment (including NVMe), the queues may be considered individually for identifying when conditions are optimal for slow writing to the flash. Detection of sporadic writes on a single queue while other queues have sustained writes can be achieved in multiple ways. For example, host-side queue depth (as with a single-queue device) may be a reflection of potential idle times. Since each queue may represent a different processor core on the host, it is possible that one queue represents an idle workload while the others are engaged in sustained write activity. In one embodiment, the host may determine power states which may be indicative of a longer idle time. For example, if the host lowers the operational power state from the maximum performance state (e.g. PS0 in NVMe devices) to a lower operational power state, this may indicate that the host is expecting reduced performance from the device.

As another example, if interrupt coalescing is enabled on a per-queue basis, queues in which interrupt coalescing is disabled or which consistently exceed their timer threshold values may also be considered candidates for slow write treatment. Interrupt coalescing includes preventing the sending of interrupts more than every X milliseconds or unless you complete at least Y commands. An interrupt goes back to the host to identify when a command is completed. The interrupts on the host side stop the host for handling. If host is not responsive, then it may be a bad time to slow down device.

As a third example, if weighted round robin arbitration (e.g. in NVMe) is selected on the host, low priority queues (as designated by the host) may be candidates for slow write. These are indicated by the host to be asynchronous or lazy writes for which the host is not waiting for a response, and in which write latency is unimportant. As a fourth example, log writes or page writes (swap file) may be high priority, but still may be slow programmed. In other words, there may be a slow write for certain high priority queue items (e.g. log writes or page writes or swap file writes) because the data must be maintained.

Figure 1A:
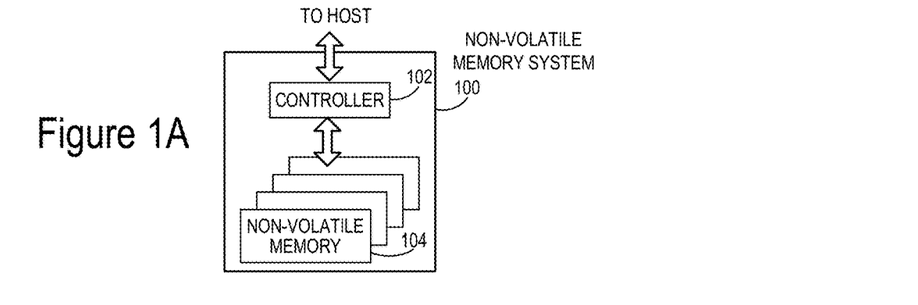
FIG. 1A is a block diagram of an example non-volatile memory system.

FIGS. 1A-2B are exemplary memory systems which may implement the adaptive trimming while writing to/from a memory card. FIG. 1A is a block diagram illustrating a non-volatile memory system. The non-volatile memory system 100 includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

Examples of host systems include, but are not limited to, personal computers (PCs), such as desktop or laptop and other portable computers, tablets, mobile devices, cellular telephones, smartphones, personal digital assistants (PDAs), gaming devices, digital still cameras, digital movie cameras, and portable media players. For portable memory card applications, a host may include a built-in receptacle for one or more types of memory cards or flash drives, or a host may require adapters into which a memory card is plugged. The memory system may include its own memory controller and drivers but there may also be some memory-only systems that are instead controlled by software executed by the host to which the memory is connected. In some memory systems containing the controller, especially those embedded within a host, the memory, controller and drivers are often formed on a single integrated circuit chip. The host may communicate with the memory card using any communication protocol such as but not limited to Secure Digital (SD) protocol, Memory Stick (MS) protocol and Universal Serial Bus (USB) protocol.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system. For example, the flash memory may be embedded within the host, such as in the form of a solid state disk (SSD) drive installed in a personal computer.

Although in the example illustrated in FIG. 1A, non-volatile memory system 100 includes a single channel between controller 102 and non-volatile memory die 104, the subject matter described herein is not limited to having a single memory channel. For example, in some NAND memory system architectures, such as in FIGS. 1B and 1C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

Figure 1B:
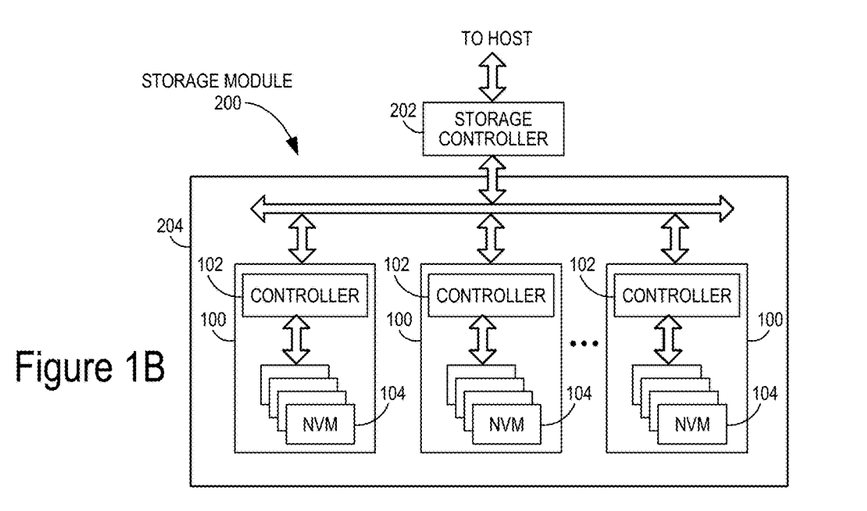
FIG. 1B is a block diagram illustrating a storage module that includes a plurality of non-volatile memory systems.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

Figure 1C:
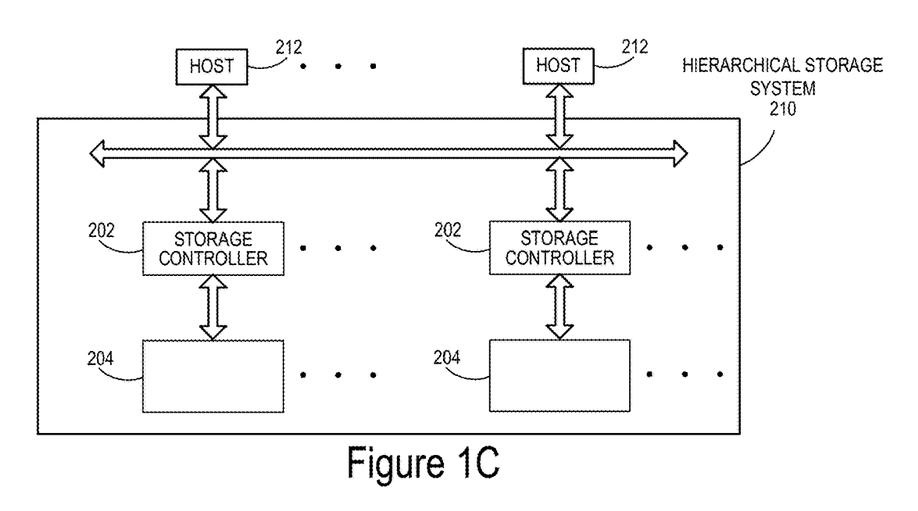
FIG. 1C is a block diagram illustrating a hierarchical storage system.

FIG. 1C is a block diagram illustrating a hierarchical storage system. A hierarchical storage system 210 includes a plurality of storage controllers 202, each of which control a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
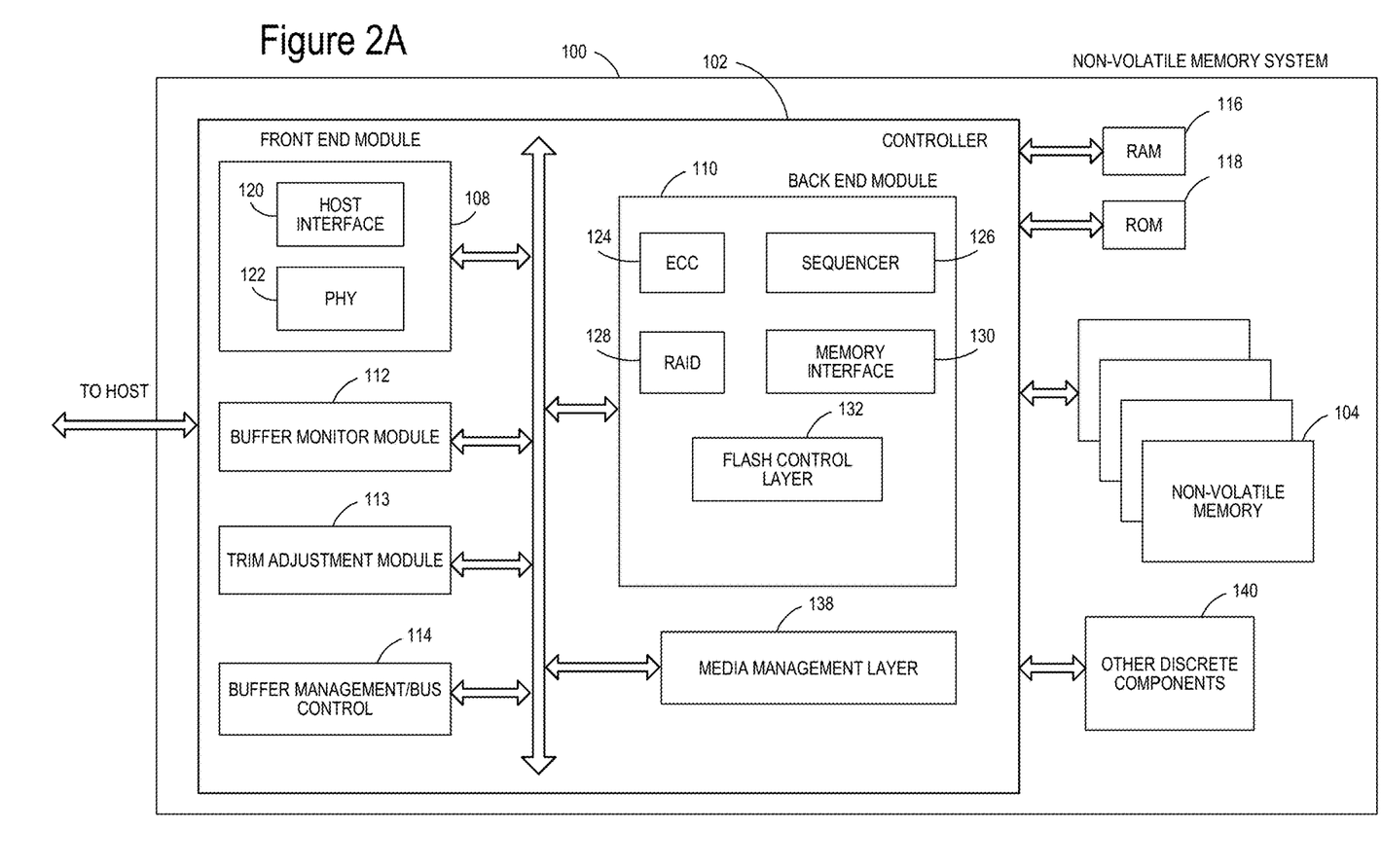
FIG. 2A is a block diagram illustrating exemplary components of a controller of a non-volatile memory system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail.

A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 104, for example, that comprises instructions executable with a processor to implement one or more of the features of the module. When any one of the modules includes the portion of the memory that comprises instructions executable with the processor, the module may or may not include the processor. In some examples, each module may just be the portion of the memory 104 or other physical memory that comprises instructions executable with the processor to implement the features of the corresponding module.

Modules of the controller 102 may include a buffer monitor module 112 and/or a trim adjustment module 113 present on the die of the controller 102. As explained in more detail below in conjunction with FIGS. 3-6, the buffer monitor module 112 may identify a data throughput from the host and the trim adjustment module 113 may match the throughput from the buffer to the flash memory 104 to the data throughput from the host. As described below with respect to FIG. 3, the buffer may be RAM 116 or other storage on the controller (e.g. at the front end module 108) that acts as a buffer for data between the host and the flash. In particular, the buffer is where data is collected before transferring to the flash memory.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller. Further, in some implementations, the controller 102, RAM 116, and ROM 118 may be located on separate semiconductor die.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the non-volatile memory system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include media management layer 138, which performs wear leveling of memory cells of non-volatile memory die 104. System 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

The FTL or MML 138 may be integrated as part of the flash management that may handle flash errors and interfacing with the host. In particular, MML may be a module in flash management and may be responsible for the internals of NAND management. In particular, the MML 138 may include an algorithm in the memory device firmware which translates writes from the host into writes to the flash memory 104. The MML 138 may be needed because: 1) the flash memory may have limited endurance; 2) the flash memory 104 may only be written in multiples of pages; and/or 3) the flash memory 104 may not be written unless it is erased as a block. The MML 138 understands these potential limitations of the flash memory 104 which may not be visible to the host. Accordingly, the MML 138 attempts to translate the writes from host into writes into the flash memory 104. As described below, erratic bits may be identified and recorded using the MML 138. This recording of erratic bits can be used for evaluating the health of blocks.

Figure 2B:
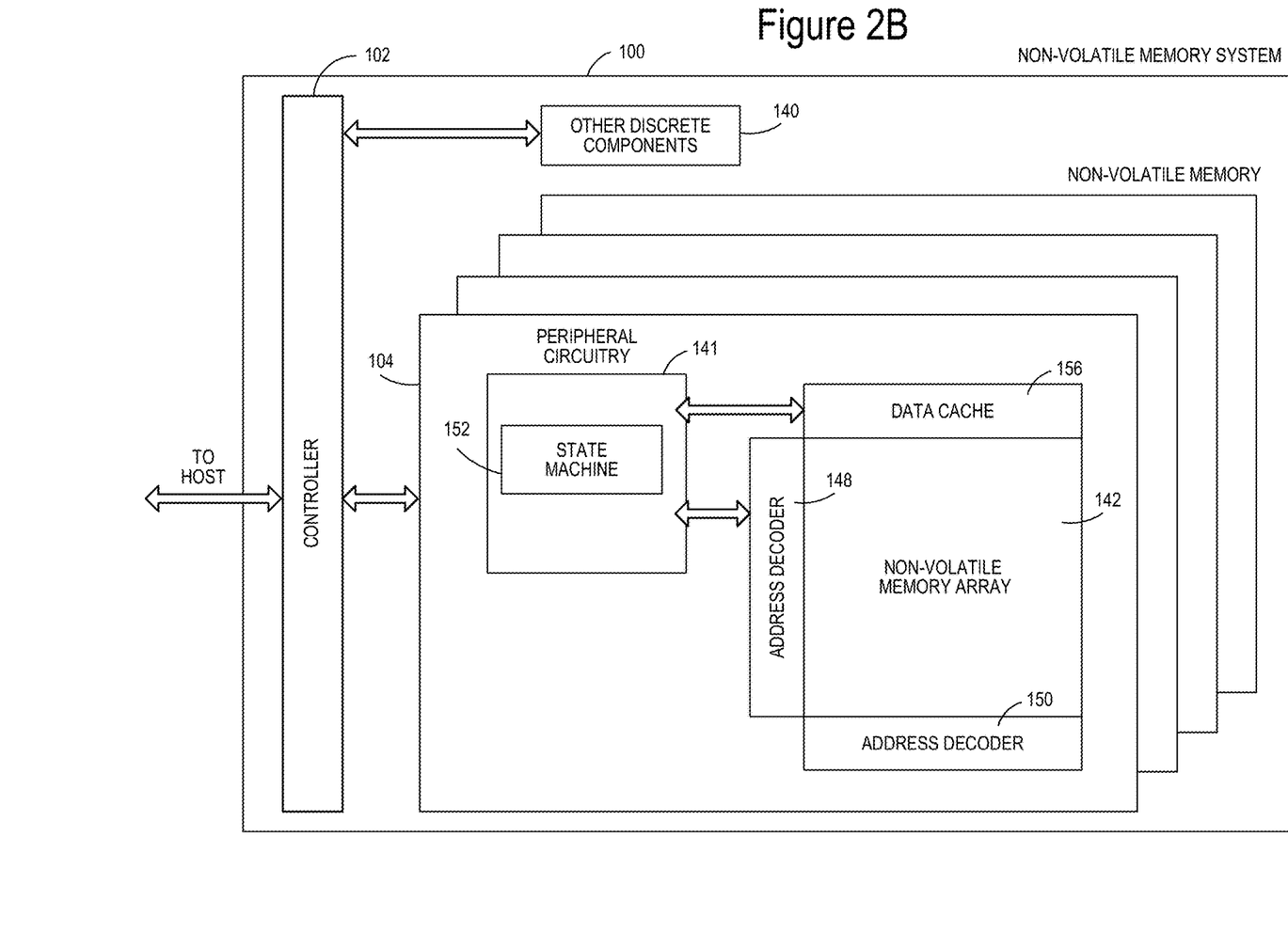
FIG. 2B is a block diagram illustrating exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data.

Figure 3:
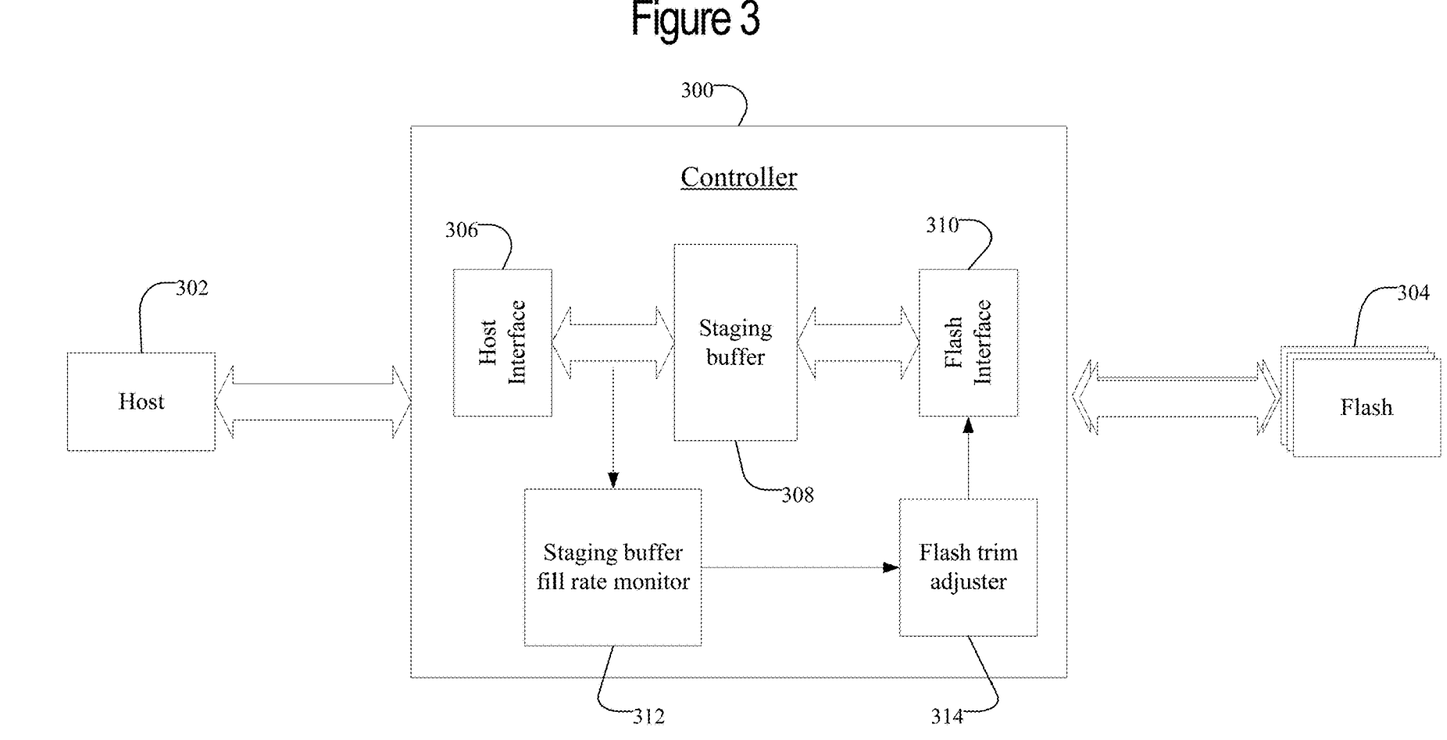
FIG. 3 is a block diagram illustrating a memory system with buffer monitoring.

FIG. 3 is a block diagram illustrating a memory system with buffer monitoring. The controller 300 (e.g. the controller 102) is coupled with a host 302 and memory (e.g. flash 304). The storage device includes a host interface 306 for communicating with the host 302 and a flash interface 310 for communicating with the flash 304. A staging buffer 308 may be coupled with both the host interface 306 and the flash interface 310 and used as an intermediate, temporary storage location for data transmitted between the host 302 and the flash 304. The staging buffer 308 may be a type of RAM (e.g. RAM 116 in FIG. 2A) and may include either SRAM or DRAM. As described below, FIGS. 4A-B further illustrate data transfer between the host and flash. FIG. 3 illustrates a staging buffer fill rate monitor 312 that may be the same as or similar to the buffer monitor module 112 in FIG. 2A. The flash trim adjuster 314 may be the same as or similar to the trim adjustment module 113 in FIG. 2A. As shown in FIG. 3, the monitor 312 monitors the staging buffer fill rate from the host interface 306. In other words, the data rate for data put into the buffer 308 is monitored by the monitor 312. Based on that monitored value, the flash trim adjuster 314 may communicate with the flash interface 310 to reduce the data transfer rate from the buffer 308 to the flash 304. In an alternative embodiment, the staging buffer may reside on the host. For example, DRAM-less designs using the host memory buffer feature may keep staging data on the host and transfer directly to the flash without an intermediate SRAM buffer.

Figure 4A:
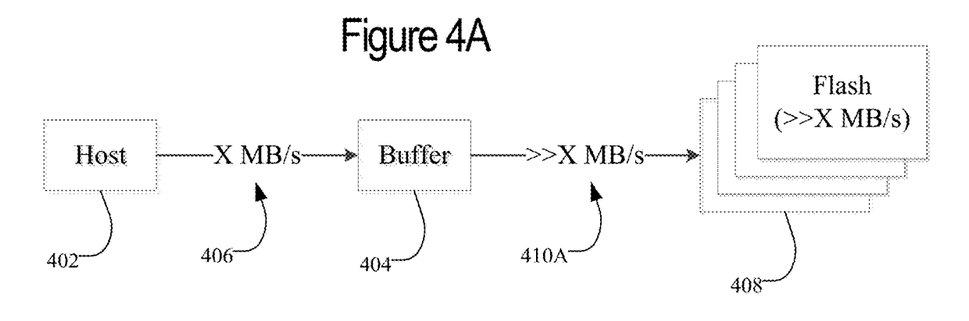
FIGS. 4A-4B are block diagrams of a memory system illustrating the adjustment of throughput from the buffer.
Figure 4B:
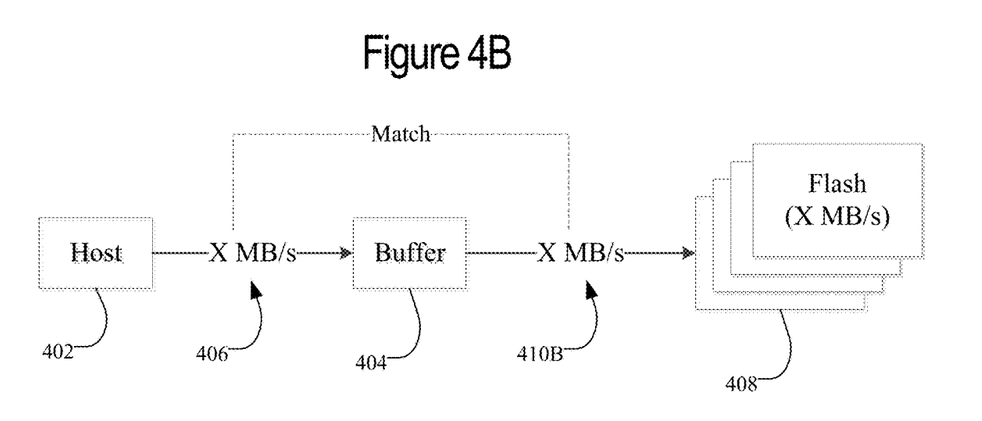

FIGS. 4A-4B are block diagrams of a memory system illustrating the adjustment of throughput from the buffer. FIG. 4A illustrates a host 402 that communicates with the flash memory 408 through a buffer 404. The buffer 404 may be the staging buffer 308 from FIG. 3. The data rate (i.e. throughput) 406 from the host 402 to the buffer 404 is shown as X megabytes per second. The data rate 410A of the buffer 404 to the flash 408 is shown as much greater than X megabytes per second. This is because many systems operate in such a way that data is written to the flash layer at the maximum possible rate at all times. In other words, the buffer 404 can write the data to the flash 408 much faster than the data can be transferred from the host 402. FIG. 4B illustrates an alternative embodiment of this data transfer in which the data transfer 410B from the buffer 404 to the flash 408 is matched to the data transfer 406 from the host 402 to the buffer 404. In particular, the buffer fill rate monitor 312 or buffer monitor module 112 may monitor the data rate 406 at which the buffer 404 is filled by the host 402. The flash trim adjuster 314 or trim adjustment module 113 may modify the data rate 410B at which the buffer 404 writes to the flash layer 408. The data transfer rate 410B may be slowed from the data transfer rate 410A even if it does not match the data transfer rate 406 of the host. Any slowing of the data transfer rate 410B from the buffer to the flash 408 may reduce wear and improve endurance of the flash 408. In addition, this scheme may allow for adaptively controlling the peak power consumption in the flash device based on the host idle time and flash throughput throttling. Based on the host data throughput, the system/FIM clock frequencies can be adaptively changed to reduce the steady state power consumption.

In the scenario shown in FIG. 4A, the system waits for the host to turnaround and provide another write command. This memory may be tuned for a certain number of cycles. Conversely, in the scenario shown in FIG. 4B, the flash memory parameters are tuned based on the host idle time as further described below with respect to FIGS. 5A-B and once data is received at the flash layer 408, the host turnaround time may be utilized to do a slower write. Upon detection of the incoming data rate 406, firmware may detect a detune ratio. As described, the flash program throughput may be reduced based on the incoming data rate from the host (or slower traffic). Accordingly, the flash trim parameters may be "tuned" so as to decrease the raw flash throughput. The ratio of the new throughput compared to the old (default) value may be referred to as the detune ratio.

The firmware may pick a new flash program trim set that changes the throughput. The firmware may program the slower data to a new block (rather than mix fast program and slow program data together). The slower data may be more reliable as compared to the faster data. Accordingly, the data may need to be moved later (and less often). Putting slow data in a separate/new block can ensure that the block as a whole is reliable and need not be scrubbed. Conversely, mixing of data may result in moving data unnecessarily (more copy than required), and part of the block (fast data) may have to be moved and this creates holes which may consequently lead to another move (i.e. compaction). Using a separate block may allow the data retention scrub to happen less often. The effects of data retention may be more severe on faster data because the margins are lower in this case. Hence the scrubbing might only be needed on the faster data.

The transfer rate 410B to the flash may be determined based on host activity (e.g. frequency of write commands and idle time). In particular, the transfer rate 410B must be high enough to handle all incoming data, but should also be reduced for improvements in data retention and endurance that result from the lower write speed on the flash. The change to the rate may be based on the detune ratio. In one embodiment, the rate at which the buffer is filled may determine the transfer rate 410B to the flash. For example, in the NVMe protocol, the queue can be analyzed to determine upcoming writes (and idle times). NVMe is a high performance protocol based on PCIe with a wide channel to the host and shared memory model where the host and client share memory. NVMe allows for multiple queues with long queue depth. As described below, the queues can be analyzed and considered individually for predicting future idle times during which the flash programming can be slowed. NVMe allows for individual queues to be identified and to then determine which of those queues to slow down. Multiple core processors may have different queues for each core.

Figure 5A:
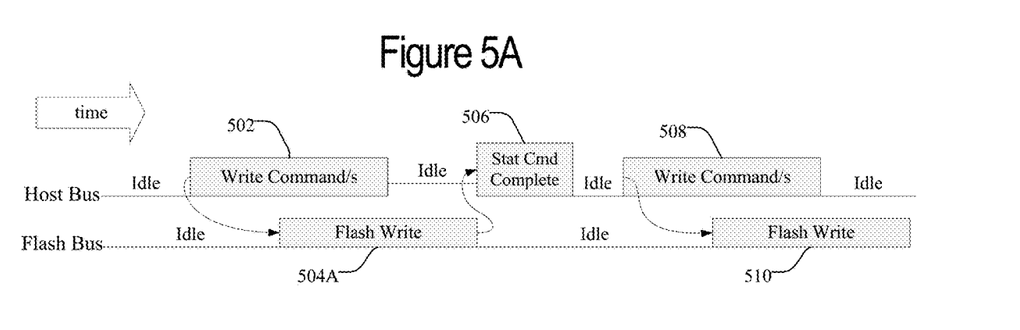
FIGS. 5A-5B are timing diagrams illustrating writes from host and flash.
Figure 5B:
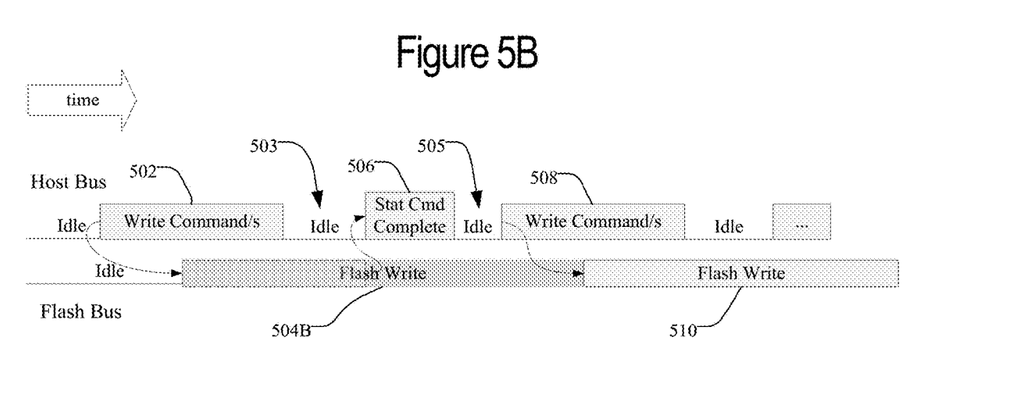

The write speed to the flash is maximized when the frequency of writes is increased and the data buffer is being filled, but the write speed to the flash is minimized when there is idle time and the queue is not very deep. Likewise, the priority of the items to be written may determine the write speed. If all items to be written are higher priority, the write speed may be maximized to handle the high priority items. FIG. 5 illustrates host turnaround time as one example for which flash writing from the buffer may be reduced.

FIGS. 5A-5B are timing diagrams illustrating writes from host and flash. In FIG. 5A, a write command 502 is received on the host bus which triggers a flash write 504A on the flash bus. After the flash write is completed, a status command complete 506 is triggered on the host bus and the next write command 508 is received which results in a corresponding flash write 510 on the flash bus. At the flash write 504A, there may be an assumption by the device that it should finish the flash write 504A as fast as possible in order to accept a new command. However, based on host activity there may not be an impending host command.

While FIG. 5A may be an embodiment where the flash write (from the buffer) is written at the maximum data rate, FIG. 5B illustrates that a reduction of that maximum data rate may be possible. Idle times 503, 505 are examples of host turnaround time (HTAT). The HTAT gaps in the host bus allows the flash bus to reduce its write speed. The host takes time to issue the next write command and the buffer is filled up again and then a write is performed, so there is enough time to slow down the flash write. Once the write command 502 is received, the flash write 504B is slower to take advantage of the idle times in the host bus. Low queue depth (i.e. 1) with large idle periods, sporadic log writes, or a slower operating host may all allow the flash bus to write slower.

Figure 6A:
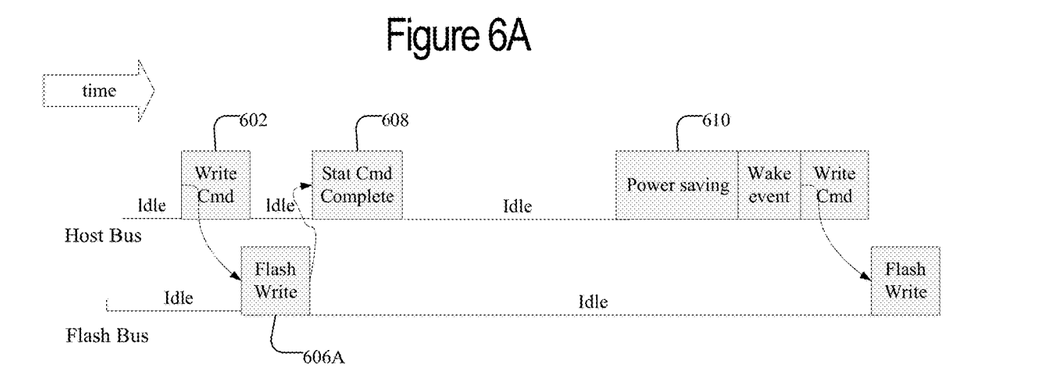
FIGS. 6A-6B are timing diagrams illustrating sporadic writes.
Figure 6B:
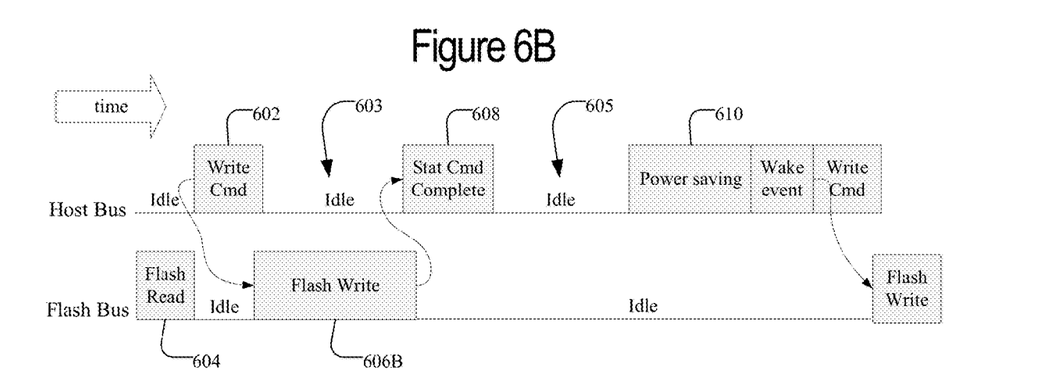

FIGS. 6A-6B are timing diagrams illustrating sporadic writes. The write command 602 is received on the host bus. In this example, the write command 602 may be a flush command which is associated with sporadic writes and long idle periods followed by power saving 610. In other words, when a flush command is recognized, then the buffer can utilize a slower write to the flash because of the idle time that follows the status command complete 608. In FIG. 6A, the flash write 606A is shown at maximum transfer speed which results in a long idle time for the flash bus. In FIG. 6B, when the write command 602 is recognized as a flush command, the flash write 606B can be slowed down. Likewise, a flash read 604 may be utilized for a collection of persistent data at the idle time and in anticipation of a sporadic write. For example, the flash read 604 may be the collection of data which may be needed (e.g. in garbage collection).

In the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magneto-resistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory. In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

It is intended that the foregoing detailed description be understood as an illustration of selected forms that the invention can take and not as a definition of the invention. It is only the following claims, including all equivalents that are intended to define the scope of the claimed invention. Finally, it should be noted that any aspect of any of the preferred embodiments described herein can be used alone or in combination with one another.

We claim:

1. A method for adaptive trimming on flash memory, the method comprising:
    receiving write commands from a host;
    detecting write traffic throughput from the host to a memory buffer;
    detecting, by firmware, a detune ratio corresponding to the traffic throughput; and
    trimming, according to at least one trim parameter, a traffic throughput from the memory buffer to the flash memory based on the detected detune ratio and based on a priority of the write commands, wherein the priority is designated by and received from the host, wherein the traffic throughput from the memory buffer to the flash memory is trimmed to be closer to the traffic throughput from the host to the memory buffer when the write commands are not a high priority, wherein the at least one trim parameter is adjusted based on a host idle time.

2. The method of claim 1 wherein the write traffic throughput from the memory buffer to the flash memory is greater than the write traffic throughput from the host to the memory buffer.

3. The method of claim 2 wherein the trimming comprises reducing the write traffic throughput from the memory buffer to the flash memory based on the write traffic throughput from the host to the memory buffer.

4. The method of claim 3 wherein the write traffic throughput from the memory buffer to the flash memory is matched to the write traffic throughput from the host to the memory buffer.

5. The method of claim 3 wherein the trimming is triggered based on predicted idle time between the write commands and is triggered when the write commands comprise flush commands.

6. The method of claim 3 wherein the write traffic throughput from the memory buffer to the flash memory device is not trimmed to be closer to the write traffic throughput from the host to the memory buffer when the priority of the write commands is high.

7. The method of claim 3 wherein the trimming is based on a priority of the write commands.

8. The method of claim 1 wherein the memory buffer comprises a random access memory that temporarily stores data to be transferred from the host to the flash memory.

9. The method of claim 1 wherein the flash memory comprises a three-dimensional (3D) memory configuration, and wherein a controller is associated with operation of and storing to the flash memory.

10. A storage device comprising:
 a non-volatile memory;
 a buffer for storing data to be written to the non-volatile memory;
 a buffer monitor module that monitors a data transfer rate for the data to be stored at the buffer; and
 a trim adjustment module that identifies future idle time from a host device providing commands to the storage device that is based on identifying a queue from multiple host side queues, and adjusts a data transfer rate from the buffer to the non-volatile memory from a first trim set to a second trim set that is based on a detune ratio detected by firmware and based on the identified future idle time, wherein the first trim set comprises a standard data transfer rate from the buffer to the non-volatile memory and the second trim set comprises a slower data transfer rate from the buffer to the non-volatile memory, further wherein data written using the second trim set is stored in a different set of blocks in the non-volatile memory from data written using the first trim set, wherein the second trim set is adjusted based on the future idle time of the host, wherein the detune ratio is detected by the firmware in response to the monitored data transfer rate to the buffer.

11. The storage device of claim 10 wherein the buffer monitor module and the trim adjustment module are part of a controller.

12. The storage device of claim 11 wherein the buffer comprises a read access memory that is coupled to the controller, further wherein the data stored in the buffer is data transferred from a host to the non-volatile memory.

13. The storage device of claim 12 wherein the non-volatile memory comprises a three-dimensional (3D) memory configuration, and wherein the controller is associated with operation of and storing to the non-volatile memory.

14. The storage device of claim 10 wherein the non-volatile memory comprises NAND flash memory.

15. The storage device of claim 14 wherein the identification of the queue from multiple host side queues is a queue most likely to have idle time.

16. The storage device of claim 15 wherein the trim adjustment module is initiated by a controller upon the identification of future idle time.

17. The storage device of claim 10 wherein the data transfer rate from the buffer to the non-volatile memory is reduced to approximate the monitored data transfer rate.

18. A memory system for improving memory endurance, the system comprising:
 a flash memory module;
 a staging buffer that receives data to be written to the flash memory module;
 a monitor that monitors a transfer rate of data transferred to fill the staging buffer and monitors a queue for data to be written; and
 a flash trim adjuster that reduces a transfer rate, according to a parameter detune ratio detected by firmware, from the staging buffer to the flash memory module based on the monitored transfer rate of the data transferred to the staging buffer and based on a future idle time identified by a power state from the host, wherein the transfer rate from the staging buffer to the flash memory module is not reduced when the queue for the data to be written includes a long queue depth, wherein the at least one trim parameter is adjusted based on the future idle time, wherein the firmware is configured to detect the detune ratio in response to the monitored transfer rate, and wherein data written at the reduced transfer rate is stored in memory blocks separate from other data.

19. The system of claim 18 further comprising:
 a host that provides the data to the staging buffer, wherein the queue comprises a host queue;
 further wherein the host queue is analyzed to identify potential idle times of the host based on write commands in the queue in order to trigger the flash trim adjuster.

20. The system of claim 18 wherein the flash trim adjuster matches the transfer rate to the staging buffer to the flash memory to the transfer rate.

* * * * *